Patented Oct. 8, 1946

2,408,835

UNITED STATES PATENT OFFICE 2,408,835

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,759

7 Claims. (Cl. 260—239.5)

The invention relates to new carbon ring saturated steroidal sapogenin compounds having hydroxyl groups and/or groups hydrolyzable to hydroxyl at positions 2 and 3 of the steroid nucleus and also one of these same groups or a ketone group at position 12 of the steroid nucleus.

It is known that steroidal compounds, that is, compounds containing a 10,13-dimethyl cyclopentanopolyhydrophenanthrene nucleus, are present in plant tissues such as Beth root (*Trillium erectum*), *Digitalis purpurea*, etc. However, the number of known plant sources of such steroidal compounds is relatively quite limited and the types of steroidal compounds which have thus far been found in practical quantities in plant tissues are also quite limited in number.

Only one steroidal compound has been known which occurs in plant tissue and which at the same time has an oxygen atom attached to the $C_{12}$ carbon atom of the steroidal nucleus. That compound is digoxigenin having a hydroxyl group (—OH) attached to the $C_{12}$ carbon atom and being a compound of the cardioactive type having no practical value as an intermediate for sex hormone type products. Although digoxigenin is a steroidal compound, it is not a sapogenin and its side chain attached to ring D of the steroid nucleus is of a distinctly different type from the sapogenin type side chain present in the new genins of my invention.

I have now discovered that certain plants and products derived therefrom can be treated by physical and chemical methods in order to obtain new valuable $C_{12}$-substituted steroidal sapogenins.

The new compounds of the invention have the general formula,

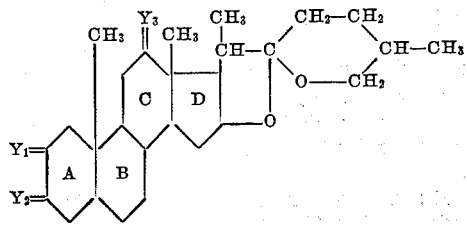

where $Y_1$ and $Y_2$ are the same members of the class consisting of

and groups hydrolyzable to

and $Y_3$ is a member of the class consisting of =O,

and groups hydrolyzable to

These compounds are new valuable starting materials for the preparation of physiologically active substances such as sex hormones and the like. They are especially valuable for the preparation of physiologically active steroidal compounds of the type derived from the mammalian suprarenal cortex which have an oxygen containing group in ring C of the cyclopentanopolyhydrophenanthrene nucleus.

In order to get a sapogenin fraction from plants, for use in obtaining the new compounds of the invention, I use one of the methods described in the following general procedure.

GENERAL PROCEDURE FOR OBTAINING A SAPOGENIN FRACTION

In obtaining the new compounds, the plant or part of the same which is to be extracted is cut up, ground or shredded and then extracted either with hot water or a lower aliphatic alcohol such as ethyl alcohol.

The plant may be dried before extraction, but I prefer to extract the plant without any preliminary drying. I also prefer to use an alcohol solvent such as ethanol or about 95% hot aqueous ethanol. For example, if one has about 25 kilograms of undried and cut up parts of the plants, such as stems, soft roots, leaves or fruit, these can be covered over with about 32 liters of 95% ethanol and heated under a reflux condenser at moderate steam bath temperature for about 12 hours. The hot extract can then be strained through cheese cloth, the filter cake washed with two 7-liter portions of hot ethanol and then squeezed dry. The extract and wash alcohol can be evaporated to a syrup and the syrup concentrated by passing a current of air over its surface. When using hot water as the extracting agent, the evaporation takes place much more slowly.

After evaporation, the concentrate containing saponins and like combinations of the steroidal sapogenins must be hydrolyzed in order to liberate the sapogenins. This is best accomplished by aqueous or alcoholic strong mineral acid. For example, the above mentioned concentrate from 25 kg. of plant material can be hydrolyzed by refluxing it for 2 hours with 3 liters of 2N ethanolic hydrochloric acid. The reaction mixture is cooled and filtered. If any considerable tar is present at this stage, it can be ground and digested several times with an equal volume of hot alcohol. The combined alcoholic filtrates are diluted with 20 liters of diethyl ether and the solution washed successively with water, 5% sodium hydroxide and water and evaporated. Fatty esters in the residue thus obtained can be hydrolyzed by refluxing the residue with 3 volumes of 10% alcoholic potash for 30 minutes. The cooled mixture from the alkaline hydrolysis is extracted with ether and the ethereal solution washed with water and then evaporated to give a sapogenin fraction which is dissolved in acetone, treated with active charcoal such as the product known as "Norite" and filtered. The clarified filtered acetone solution contains the sapogenin fraction of the plant and can be separated from the acetone by evaporating the latter. Such sapogenin fractions consist of mixtures of sapogenins. The individual sapogenins are next isolated or separated out of this fraction.

The above description is a general procedure which I use for obtaining a sapogenin fraction or mixture. It is merely illustrative and is capable of considerable variation, as will be understood by those skilled in the art. Any known method of obtaining a sapogenin fraction by hydrolytic and solvent extraction procedures may be used, provided solvents are used which make possible the separation and isolation from the plant tissue of the greater part of the hydroxyl and ketone substituted steroidal sapogenins liberated by the hydrolytic steps.

*Example 1.—(Manogenin from Agave Huachucensis Baker)*

8 kilograms (8 kg.) of entire plants of this species are collected in September east of Tucson, Arizona. The sapogenin fraction of these plants is first obtained by the general procedure described above. It is then taken up in and crystallized from acetone. The product has a melting point (M. P.) of 234–236° C. and weighs 10.6 grams. It is recrystallized from ether and then gives the dihydroxy-ketone manogenin of M. P. 241 to 243° C.

Anal.: Calc'd for $C_{27}H_{42}O_5$: C, 72.6%; H, 9.5%. Found: C, 72.5; H, 9.4.

A solution of manogenin in ethanol is treated with a 2% solution of digitonin in ethanol. Immediately a heavy white precipitate of the digitonide of manogenin is formed.

A sample of manogenin is boiled with acetic anhydride, excess anhydride distilled off and the residue crystallized from methanol. It consists of manogenin diacetate and has M. P. 253–255° C.

Anal.: Calc'd for $C_{31}H_{46}O_7$: C, 70.2; H, 8.7. Found: C, 70.2; H, 8.6.

*Example 2.—(Mexogenin from Samuela carnerosana (Trel.))*

272 kgs. of the caudex from young plants of the species Samuela carnerosana Trel. were collected during the month of March along the Rio Grande River at Black Gap in the Big Bend region of Texas. The alcoholic concentrate from the alcoholic extraction of the 272 kgs. in accordance with the general procedure given above is dissolved in 192 liters of ethanol and hydrolyzed with 43 liters of concentrated hydrochloric acid for 3 hours. The reaction mixture is then extrated with 160 liters of butyl alcohol. The butanol extract is washed several times with water and then with 10% caustic solution. The butanol layer is washed free of alkali with water and evaporated in vacuo. The solid residue is powdered and thoroughly extracted with 160 liters of acetone. The acetone extract is then evaporated.

One half of the residue from evaporation of the acetone extract is hydrolyzed with an excess of alcoholic potash for 30 minutes. The reaction mixture is cooled to 35° C. and extracted with 40 liters of ether and the ether extract separated, washed with water and evaporated. The residue from the evaporation is separated into an acetone-soluble fraction (fraction H, see crystallization chart) and an acetone-insoluble fraction, B. The B fraction weighs 148 grams and is further crystallized from ether to give an ether-soluble fraction, D, and an ether-insoluble fraction, C, weighing 46 grams.

The ether-insoluble fraction (C) is acetylated (e. g. with acetic anhydride) and then crystallized from methanol and finally from ether. The crystals have M. P. and mixed M. P. with samogenin acetate of 195–198° C. Yield is 30 grams. Hydrolysis of this diacetate gives samogenin, M. P. and mixed M. P., 208–214° C.

Anal.: Calc'd for $C_{27}H_{44}O_4$: C, 75.0; H, 10.3. Found: C, 74.8; H, 10.2.

The properties of samogenin and its diacetate are described in J. Amer. Chem. Soc., vol. 65, pages 1199 to 1209 (1943).

The sapogenins in the ether-soluble fraction, D, are acetylated and treated with 40 grams of Girard's reagent T in 1 liter of ethanol as described for *A. Huachucensis* Baker under Example 4. The ketone fraction, E, is crystallized from ether-pentane, M. P. 195–200° C., and weighs 34 grams. This material is recrystallized from 125 cc. of ether to give a small ether-insoluble fraction, M. P. and mixed M. P. with kammogenin diacetate, 258–261° C. and weighs 1.5 grams. See above article in J. A. C. S. 65, 1199–1209 (1943).

Analysis for kammogenin diacetate: Calc'd for $C_{31}H_{44}O_7$: C, 70.4; H, 9.4. Found: C, 70.5; H, 8.7.

The ether filtrate, F, after removal of kammogenin diacetate, is diluted with pentane, concentrated and cooled to give mexogenin diacetate, M. P. and mixed M. P., 204–206° C.; yield is 25 grams.

Anal.: Calc'd for $C_{31}H_{46}O_7$: C, 70.2; H, 8.7. Found: C, 70.3; H, 9.0.

The Girard's non-ketone fraction, G, is fractionally crystallized from methanol to give an additional 7 grams of samogenin diacetate, M. P. and mixed M. P., 195–198° C.

The acetone-soluble fraction, H, from the above steps is concentrated, cooled and filtered to give a dark semi-solid mass. This mass is hydrolyzed with excess 20% alcoholic potash for 30 minutes. The product from methanol, M. P. 172–180° C., is acetylated and treated with Girard's reagent as described previously. In this case, however, no ketone fraction is obtained. The non-ketone fraction is crystallized from acetone, M. P. and mixed M. P. with smilagenin acetate, 148–150° C., yield being 30 grams.

Anal.: Calc'd for $C_{29}H_{46}O_4$: C, 75.9; H, 10.1. Found: C, 75.9; H, 10.2.

Hydrolysis of the acetate gives smilagenin, M. P. and mixed M. P., 184–186° C.

Anal.: Calc'd for $C_{27}H_{44}O_3$: C, 77.8; H, 10.7. Found: C, 77.8; H, 10.7.

Mexogenin

The above described mexogenin diacetate can be hydrolyzed, e. g. with excess 20% alcoholic potash, and the hydrolyzed product extracted and crystallized from ether to give mexogenin of M. P. 245–246° C.

Anal.: Calc'd for $C_{27}H_{42}O_5$: C, 72.6; H, 9.5. Found: C, 72.9; H, 9.6.

Boiling acetic anhydride converts it back into its diacetate of M. P. 208° C. Mexogenin is isomeric with manogenin. It is saturated to bromine-acetic acid solution. When added to a 2% alcoholic solution of digitonin, it forms an insoluble saponide very slowly.

Although mexogenin forms a monosemicarbazone, it is not affected by the conditions of a mild Clemmensen reduction reaction, thereby indicating the inert position of the carbonyl group. In this respect, it is like the other 12-keto-steroidal sapogenins. Wolff-Kishner reduction removes the carbonyl group, giving samogenin. The reduction product when converted to its diacetate, is identical with samogenin diacetate. Hence, the relationship of mexogenin to samogenin is thereby further established. The transformation to samogenin can be illustrated as follows.

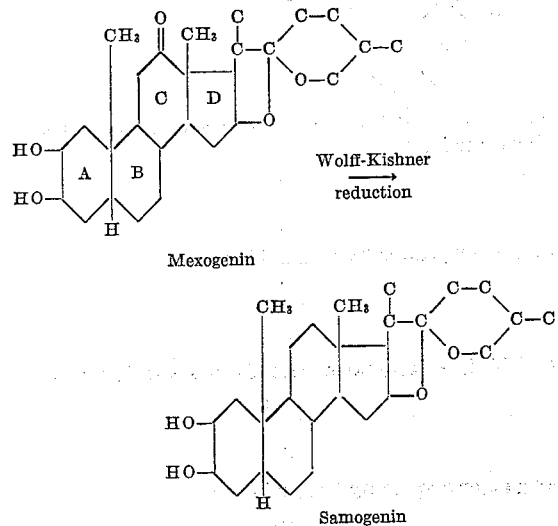

Crystallization chart for the sapogenins from the March collection (272 kg.) of *Samuela carnerosana* Trel.:

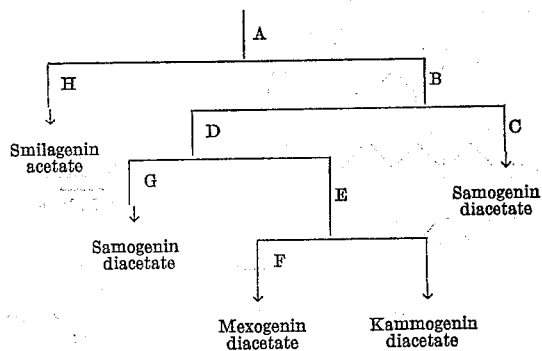

A. Crystallization from acetone; B. Crystallization from methanol and then ether; C. Acetylation. Crystallization from methanol and then ether; D. Evaporation. Acetylation. Treatment with Girard's reagent T; E. Crystallization of ketone fraction from ether; F. Dilution of ether mother liquor with pentane. Slow evaporation and crystallization; G. Crystallization of non-ketone fraction from methanol; H. Evaporation. Hydrolysis. Crystallization from methanol. Acetylation. Treatment with Girard's reagent T. (No ketone fraction obtained.) Crystallization of non-ketone fraction from acetone.

*Example 3.—Synthesis of agavogenin from manogenin*

(a) By catalytic hydrogenation: An ethereal solution of 0.3 g. of manogenin containing several drops of acetic acid is shaken with hydrogen and Adams catalyst for three hours at room temperature and three atms. Agavogenin is crystallized from aqueous methanol, M. P. 233–240°. A mixture with the starting material (240°) gives a melting point elevation, 242–247°.

Anal.: Calc'd for $C_{27}H_{44}O_5$: C, 72.3; H, 9.9. Found: C, 72.2; H, 9.9.

The triacetate is prepared by refluxing a solution of the triol in acetic anhydride for one hour. The solvent is removed and the residue is crystallized from methanol as plates, M. P. 226–228° C.

Anal.: Calc'd for $C_{33}H_{50}O_8$: C, 69.0; H, 8.8. Found: C, 68.5; H, 8.7.

(b) By sodium-ethanol reduction: To a solution of one gram of manogenin diacetate in 300 cc. of absolute ethanol is added 23 g. of sodium over a period of thirty minutes. After the sodium has reacted the reaction mixture is diluted with water and ether extracted. The ethereal solution is washed free of alkali with 10% hydrochloric acid and evaporated. Agavogenin crystallizes from ether as white needles, M. P. 238–240°; yield, 0.25 g. A mixture with material from (a) melts 240°.

Anal.: Calc'd for $C_{27}H_{44}O_5$: C, 72.3; H. 9.9. Found: C, 72.0; H, 9.8.

The triacetate is prepared by refluxing with acetic anhydride for one hour. It is crystallized from methanol as plates, M. P. and mixed M. P. triacetate from (a), 226–228°.

Anal.: Calc'd for $C_{33}H_{50}O_8$: C, 69.0; H, 8.8. Found: C, 68.5; H, 8.8.

In addition to the above described properties of agavogenin, it also is converted by mild (e. g. 25° C.) chromic anhydride oxidation to hecogenic acid. The latter oxidation product is identical with the hecogenic acid from mild oxidation by $CrO_3$ of manogenin. Hence, agavogenin is 12- dihydro-manogenin. These changes can be illustrated as follows.

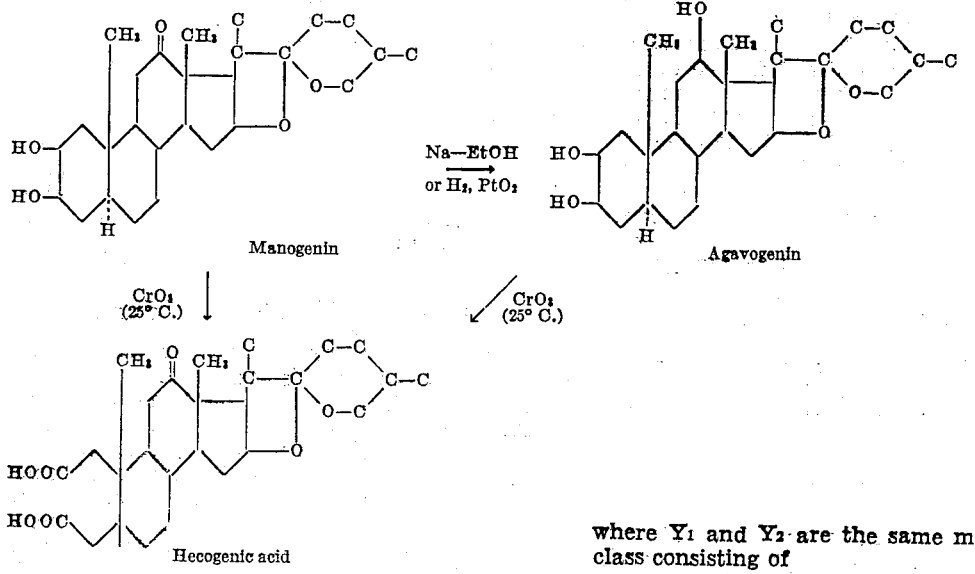

The examples given are for the purpose of illustrating the invention and can be varied in a good many ways. For instance, acetic anhydride is used as the acylating agent for the alcoholic hydroxyl groups of the new compounds. However, one may use any of the known organic agents for converting alcoholic OH to an ester or ether or other group capable of hydrolysis to give —OH. Such agents are, for example, organic acid halides, acetyl chloride, benzoyl chloride, furoyl chloride, butyric anhydride, formation of the alkali metal alcoholate followed by reaction with an alkyl halide to form an ether, use of triphenyl methyl chloride to form the so-called trityl ethers, halides such as sulfuryl chloride, phosphorus chlorides and the like.

Ring dihydroxy compounds, such as manogenin and mexogenin, or ring trihydroxy compounds such as agavogenin can be completely acylated or etherified at all of their ring hydroxyls. Completely esterified or acylated agavogenin can be partially hydrolyzed at the number 2 and number 3 carbon atoms of the ring system to obtain derivatives partially esterified or etherified at $C_{12}$ but with free hydroxyls at $C_2$ and $C_3$. Similar derivatives can be made by using alkali metal and alcohol, or hydrogen in presence of a platinum catalyst, to reduce the $C_{12}$-keto of completely esterified or etherified manogenin or mexogenin to get the corresponding compound with a free hydroxyl group at $C_{12}$. When hydrogen and a catalyst are used for reduction, the groups at $C_2$ and $C_3$ are not hydrolyzed and the $C_{12}$ hydroxyl alone can then be esterified or etherified to replace it by the same or by a different ester or ether group from that at carbon atoms 2 and 3. Thus, it is easy for those skilled in the art to prepare any of the new compounds of the invention having the general formula,

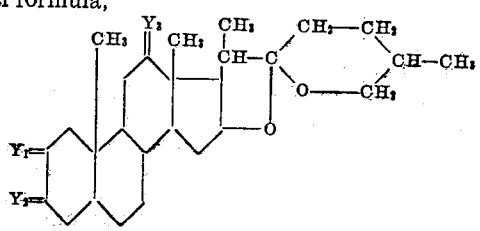

where $Y_1$ and $Y_2$ are the same members of the class consisting of

and groups hydrolyzable to

and $Y_3$ is a member of the class consisting of =O,

and groups hydrolyzable to

What I claim is:

1. A ring saturated $C_{12}$-substituted steroidal sapogenin of the fromula

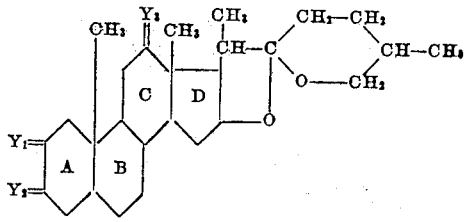

where $Y_1$ and $Y_2$ are the same members of the class consisting of

and ester groups hydrolyzable to

and $Y_3$ is a member of the class consisting of =O,

and ester groups hydrolyzable to

2. A ring saturated $C_{12}$-substituted steroidal sapogenin of the formula

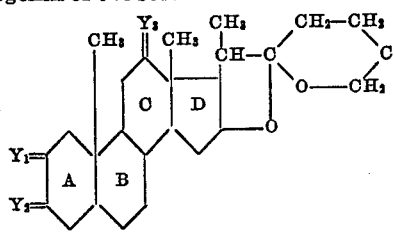

where $Y_1$ and $Y_2$ are the same members of the class consisting of

and ester groups hydrolyzable to

and $Y_3$ is a member of the class

and ester groups hydrolyzable to

3. A ring saturated $C_{12}$-substituted steroidal sapogenin of the formula

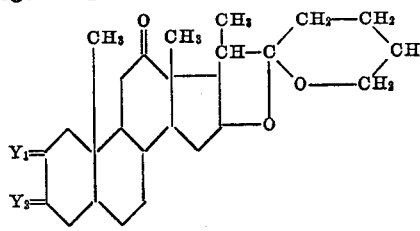

where $Y_1$ and $Y_2$ are the same members of the class consisting of

and ester groups hydrolyzable to

4. A 2,3 - dihydroxy - 12 - keto - ring saturated steroidal sapogenin of formula $C_{27}H_{42}O_5$.

5. Manogenin of the formula, $C_{27}H_{42}O_5$, the structure of which is

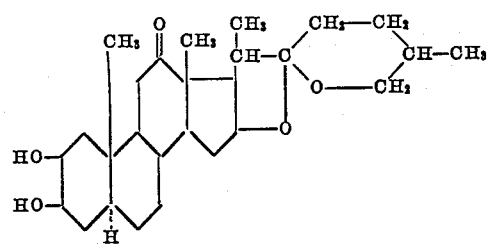

6. Mexogenin of the formula, $C_{27}H_{42}O_5$, the structure of which is

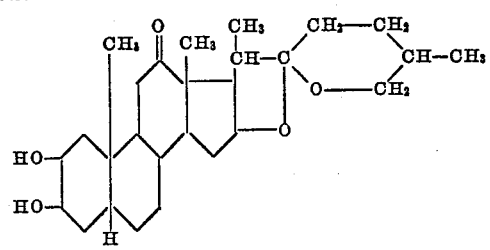

7. Agavogenin of the formula, $C_{27}H_{44}O_5$, the structure of which is

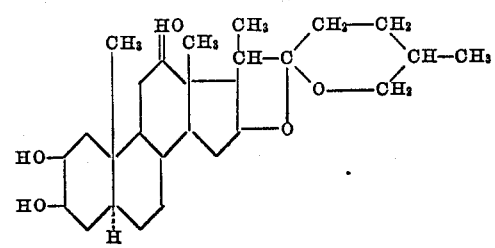

ROMEO B. WAGNER.